Feb. 14, 1928.                                                              1,658,904
                              D. RÖNNBERG
                CLUTCH MECHANISM FOR MOTOR OPERATED ELECTRIC SWITCHES
                            Filed June 4, 1926

INVENTOR
DANIEL RÖNNBERG
BY
Wm. Wallace White
ATTORNEY

Patented Feb. 14, 1928.

1,658,904

UNITED STATES PATENT OFFICE.

DANIEL RÖNNBERG, OF LUDVIKA, SWEDEN, ASSIGNOR TO ALLMÄNNA SVENSKA ELEKTRISKA AKTIEBOLAGET, OF VASTERAS, SWEDEN, A CORPORATION OF SWEDEN.

CLUTCH MECHANISM FOR MOTOR-OPERATED ELECTRIC SWITCHES.

Application filed June 4, 1926, Serial No. 113,686, and in Sweden June 19, 1925.

The present invention relates to clutch mechanism particularly adapted for motor-operated electric switches. One object of the invention is to provide quick-action of the switch by suddenly connecting it to a running motor, preferably provided with an extra fly-wheel mass. Another object of the invention is to provide an operating mechanism capable of being alternatively operated by hand.

Figure 1:
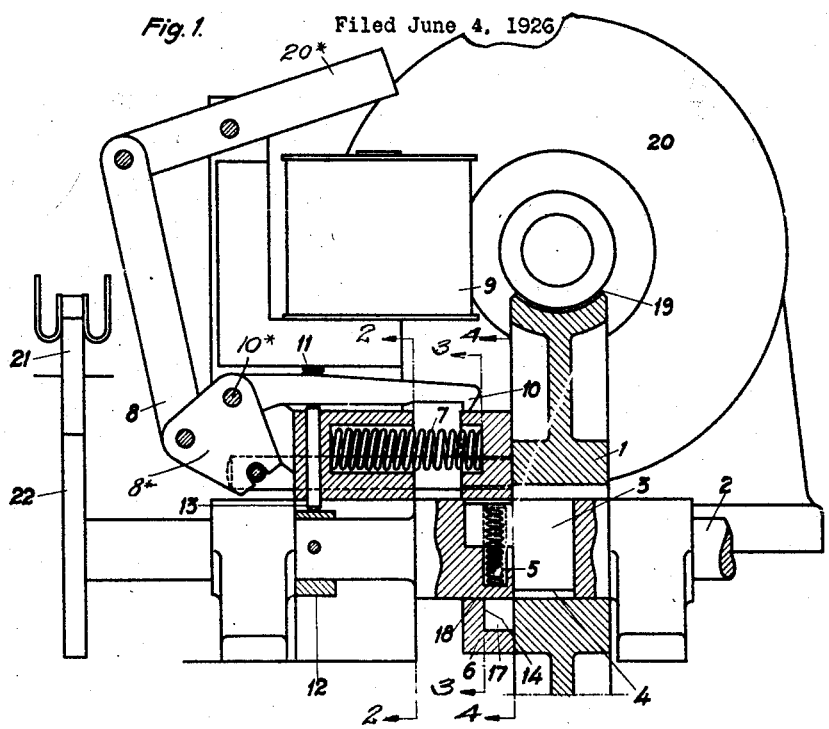
Figure 2:
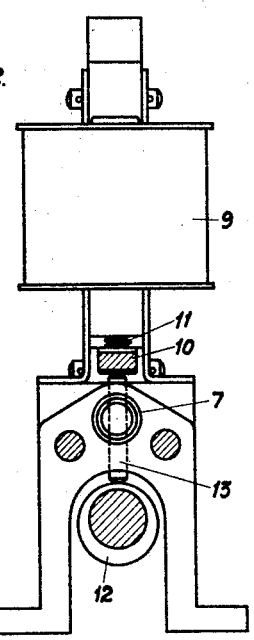
Figure 3:
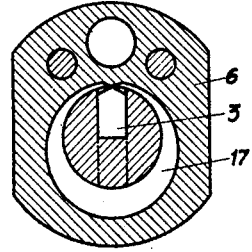
Figure 4:
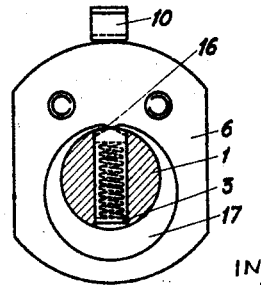

A form of the invention is illustrated in the accompanying drawing. Fig. 1 shows a side-view of a switch operated according to the invention with the operating mechanism partly in section. Fig. 2 is a section on the line 2—2 in Fig. 1. Fig. 3 is a section on the line 3—3 in Fig. 1. Fig. 4 is a section on the line 4—4 in Fig. 1.

According to the present invention, an electric motor 20 drives, by means of a worm gear 19, a wheel 1, which is mounted on a shaft 2 in such a manner, that in certain instances it runs freely on the shaft, in others it is connected thereto by a key 3 displaceable in a diametrically arranged slot 4 in the shaft. The key is under the influence of a spring 5 acting to move it to the position in which it couples together the wheel and the shaft. One portion of the key, however, projects axially beyond the wheel 1 and is surrounded by an axially movable ring or slider 6 when the latter is in one of its end positions. The ring is actuated in the axial direction by a spring 7 and by a link mechanism 8 operated by an electromagnet 9. A latch 10 actuated by a spring 11 serves to hold the ring 6 in its extreme left position, while the extreme right position is shown in the drawing. The slider 6 is loosely mounted on the shaft 2 and prevented from rotating therewith in any well-known manner; the link 8 is connected, at one end, to the armature 20* and, at the other, to the triangular lever 8*; the electromagnet 9 is mounted on the stationary framework of the mechanism; the latch 10 is mounted on a pivot 10* in the stationary frame and the spring 11 is disposed between the latch 10 and the stationary frame of the mechanism.

The arrangement described operates in the following manner. Normally, the ring 6 is in the position shown and the shaft is stationary, also in or nearly in the position shown. The ring 6 then prevents the key 3 from protruding out of the slot 4 and from connecting together the shaft 2 and the wheel 1. When such a connection is to be effected, after the wheel 1 has been started by means of the motor 20, the electromagnet 9 is energized. It then attracts its armature 20* and by means of the link mechanism 8 pulls the ring 6 over into its extreme left position where it is locked by the latch 10.

By the removal of the ring 6, the key 3 becomes free to engage the slot in the wheel 1 next time the latter passes it during the rotation of the wheel. The spring 5 secures the engagement which connects together the wheel and the shaft. The latter is thus carried forth in the rotation and effects the operation of the switch 21 by means of a cam disc 22. The switch, the details of which do not form part of the invention, is only diagrammatically shown. As soon as the aforesaid operation has been effected, the shaft 2 should again be disconnected from the wheel 1. This is effected by de-energizing the electromagnet 9. The spring then tends to press the ring 6 back again, but cannot do this before the latch 10 has been released. This releasing is effected by means of an excentric disc 12 mounted on the shaft 2 which acts on the latch by means of a pin 13 mounted in the stationary frame of the mechanism on an occasion when the shaft has been rotated one half turn from the position shown in the drawing, thus enabling the excentric opening 17 in the ring 6 immediately to catch the key 3. The ring 6, however, is not yet free to move back entirely into its original position, but stops in an intermediate position in which the end of the key slides against the plane surface 14 formed between the excentric opening 17 and a concentric opening 18 fitting around the shaft. During the following half turn of the wheel and shaft, the peripheral surface of the excentric opening acts on the key and presses it into the slot, which movement can be finally completed by means of a particular stud 16. When the key is entirely confined within the slot, the shaft is again released from the wheel 1, as the ring 6 returns to the original position, since it is no more hindered by the key. The stud 16 acts on the key 3 to positively press it entirely into its slot in the shaft after it has gradually been forced inwards by the eccentric opening 17.

Normally the entire switching operation is adapted to take place during one revolution of the shaft, whence the electromagnet 9 should be energized only as long time as it takes for the latch 10 to catch the ring 6. The release is then effected as soon as the shaft has made exactly one revolution.

The concentric opening 18 in the ring 6 normally embracing the shaft 2 and key 3 is intended to enable the mechanism to be freely operated by hand without any particular preliminary step. If the key 3 were normally guided only by the excentric opening 17, the result would be, upon a rotation of the shaft by hand, that the key would be entirely within the shaft only in one angular position and consequently ready to engage the keyway in the wheel 1 as soon as it passes the latter. The wheel and motor would then be carried forward by the shaft or the rotation of the latter be stopped, if the gear between the motor and wheel be self-locking, as is frequently the case. The concentric opening in the ring 6, on the contrary, keeps the key within its slot during the entire rotation, as long as the ring has not been axially displaced.

I claim as my invention:—

1. In clutch mechanism for motor-controlled electric switches, a rotating element, a shaft carrying said rotating element, a key movable in a slot in said shaft and capable of engaging a keyway in said rotating element, and an axially displaceable ring surrounding said shaft and having one opening concentric to said shaft and one excentric thereto, both normally embracing said key.

2. In clutch mechanism for motor-controlled electric switches, a rotating element, a shaft carrying said rotating element, a key movable in a slot in said shaft and capable of engaging a keyway in said rotating element, axially displaceable means on said shaft for permitting the temporary engagement of said key in said keyway, a latch locking said axially displaceable means in a position leaving said key free, and means for releasing said latch, upon a certain angle of rotation of said shaft, and means for restoring said axially displaceable means to a position locking said key.

3. In clutch mechanism for motor-controlled electric switches, a rotating element, a second rotating element, a key movable under spring action in a slot in one of said rotating elements and capable of engaging the other, an axially displaceable device engaging, in one position, a portion of said key by a surface concentric to the axis of rotation of the rotating elements, and in a second position a portion of said key by an excentric surface, while in a third position it leaves said key free to engage the corresponding rotating element.

In testimony whereof I have signed my name to this specification.

DANIEL RÖNNBERG.